(12) United States Patent
McKie et al.

(10) Patent No.: US 9,115,909 B2
(45) Date of Patent: Aug. 25, 2015

(54) SYSTEM AND METHOD FOR MONITORING AND REPORTING ENERGY RECOVERY VENTILATOR STATUS

(75) Inventors: Justin McKie, Frisco, TX (US); Eric Perez, Hickory Creek, TX (US); Greg Thomas, McKinney, TX (US)

(73) Assignee: Lennox Industries Inc., Richardson, TX (US)

( * ) Notice: Subject to any disclaimer, the term of this patent is extended or adjusted under 35 U.S.C. 154(b) by 855 days.

(21) Appl. No.: 13/293,881

(22) Filed: Nov. 10, 2011

(65) Prior Publication Data

US 2013/0124111 A1    May 16, 2013

(51) Int. Cl.
*G01F 1/12* (2006.01)
*F24F 11/00* (2006.01)
*F24F 12/00* (2006.01)

(52) U.S. Cl.
CPC ........... *F24F 11/0086* (2013.01); *F24F 12/006* (2013.01); *F24F 11/0001* (2013.01); *F24F 11/0012* (2013.01); *F24F 12/00* (2013.01); *F24F 2011/0013* (2013.01); *F24F 2011/0042* (2013.01); *F24F 2203/10* (2013.01); *Y02B 30/563* (2013.01)

(58) Field of Classification Search
USPC ........................................................... 702/45
See application file for complete search history.

(56) References Cited

U.S. PATENT DOCUMENTS

| | | | |
|---|---|---|---|
| 2005/0236150 A1* | 10/2005 | Chagnot et al. | 165/222 |
| 2007/0205297 A1* | 9/2007 | Finkam et al. | 236/1 C |
| 2010/0198411 A1* | 8/2010 | Wolfson | 700/275 |
| 2011/0088417 A1* | 4/2011 | Kayser | 62/94 |
| 2011/0146941 A1* | 6/2011 | Benoit et al. | 165/11.1 |
| 2012/0253526 A1* | 10/2012 | Storm | 700/278 |
| 2013/0032310 A1* | 2/2013 | Jaena et al. | 165/104.25 |
| 2013/0087302 A1* | 4/2013 | McKie et al. | 165/8 |
| 2013/0090051 A1* | 4/2013 | McKie et al. | 454/229 |
| 2013/0090769 A1* | 4/2013 | McKie et al. | 700/277 |
| 2013/0116951 A1* | 5/2013 | McKie et al. | 702/61 |

* cited by examiner

*Primary Examiner* — Sujoy Kundu
*Assistant Examiner* — Paul D Lee
(74) *Attorney, Agent, or Firm* — Baker Botts, LLP (57) ABSTRACT

An energy recovery ventilator (ERV) monitoring and reporting system and a method of monitoring and reporting information on an ERV. In one embodiment, the system includes: (1) a processor configured to carry out a plurality of monitoring and reporting functions on the ERV based on a model, and types and locations of sensors, of the ERV, (2) a memory coupled to the processor and configured to store data gathered from the sensors and (3) a commissioning database associated with the memory and configured to contain commissioning data regarding the model of the ERV.

18 Claims, 5 Drawing Sheets

SYSTEM AND METHOD FOR MONITORING AND REPORTING ENERGY RECOVERY VENTILATOR STATUS

TECHNICAL FIELD

This application is directed, in general, to heating, ventilation and air conditioning (HVAC) systems and, more specifically, to a system and method for monitoring and reporting energy recovery ventilator (ERV) status.

BACKGROUND

ERVs are used to capture energy from the exhaust air stream and through the use of enthalpy-wheels it transfers a large portion of the waste heat back into outside air intake stream. By pre-treating the outside air, cooling and heating loads are reduced. ERVs are popular in regions with high outside air humidity or extremely low or high ambient outside air temperature. This is because energy transfer increases as the temperature difference between the occupied space and the outside air increases. ERVs operate during the occupied period of a building.

When ERVs first came to market, they were often not serviced correctly, in many cases causing the equipment to fail to deliver promised benefits. Today, fresh-air ventilation requirements on commercial buildings in on the rise. This has renewed interest in technologies that can minimize the financial impact of conditioning outside air. Accordingly, ERVs are once again becoming popular in the marketplace.

SUMMARY

One aspect provides an ERV monitoring and reporting system. In one embodiment, the system includes: (1) a processor configured to carry out a plurality of monitoring and reporting functions on the ERV based on a model, and types and locations of sensors, of the ERV, (2) a memory coupled to the processor and configured to store data gathered from the sensors and (3) a commissioning database associated with the memory and configured to contain commissioning data regarding the model of the ERV.

Another aspect provides an ERV monitoring and reporting method. In one embodiment, the method includes: (1) carrying out a plurality of monitoring and reporting functions on the ERV based on a model, and types and locations of sensors, of the ERV, the carrying out including employing commissioning data regarding the model of the ERV and (2) storing data gathered from the sensors.

BRIEF DESCRIPTION

Reference is now made to the following descriptions taken in conjunction with the accompanying drawings, in which.

DETAILED DESCRIPTION

As stated above, ERVs were often not serviced correctly when they first came to market. Now that ERVs are once again becoming popular in the marketplace and information processing and storage technologies are far better than they were decades ago, an opportunity has arisen to provide better ways to monitor and track how ERVs are performing so they can be serviced correctly and demonstrate their value. In general, an opportunity exists to provide better status information for tracking service and maintenance and confirming ERV energy savings and efficiency. Beyond extending the lifespan and justifying the continued use of existing installations, the same information can be used to convince potential customers that ERVs have significantly improved and are worth a try, or perhaps another try.

Described herein are various embodiments of a system and method for monitoring and reporting ERV status. The embodiments employ data sources, namely different combinations of predetermined data sources and real-time sensor data sources, to generate information regarding the status of the ERV and prompting service and maintenance to be performed on the ERV. Certain embodiments of the system and method are embodied in software executing in a processor (e.g., a microprocessor or microcontroller), allowing the functions, capabilities and capacities of the system to be changed as data sources are added or removed or information requirements change.

In some embodiments to be illustrated and described, the system and method are configured to monitor ERV performance in real time and generate an alert when energy transfer is below a threshold, indicating that ERV maintenance would be beneficial. In other embodiments to be illustrated and described, the system and method are configured to track information over time and keep a log of it, providing information on the operating history of the ERV.

The term, "or," as used herein, refers to an inclusive or, unless otherwise indicated. Also, the various embodiments described herein are not necessarily mutually exclusive, as some embodiments can be combined with one or more other embodiments to form new embodiments.

Figure 1:
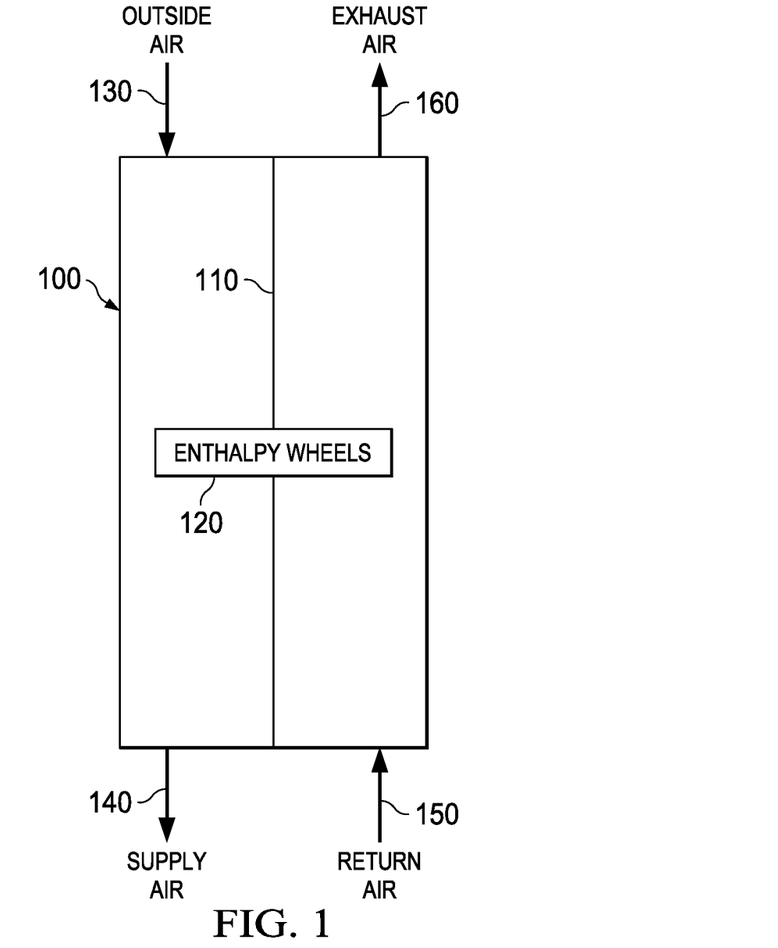
FIG. 1 is a schematic view of one embodiment of an ERV.

One embodiment of the present disclosure is an ERV. FIG. 1 is a schematic view of one embodiment of such an ERV. The ERV 100 includes an enclosure (not separately referenced. An internal wall 110 separates the ERV into two passages. One or more enthalpy wheels 120 span the two passages conveying heat therebetween by rotating.

Outside air 130 is received into one of the two passages, where it encounters the one or more enthalpy wheels 120. The one or more enthalpy wheels condition the outside air to yield supply air 140 suitable for ventilation or further conditioning by an HVAC system (not shown). Return air 150 is received from the HVAC system into the other of the two passages, where it encounters the one or more enthalpy wheels and is employed to condition the return air 150. After having been so employed, the return air becomes exhaust air 160 and is vented outside.

Figure 2:
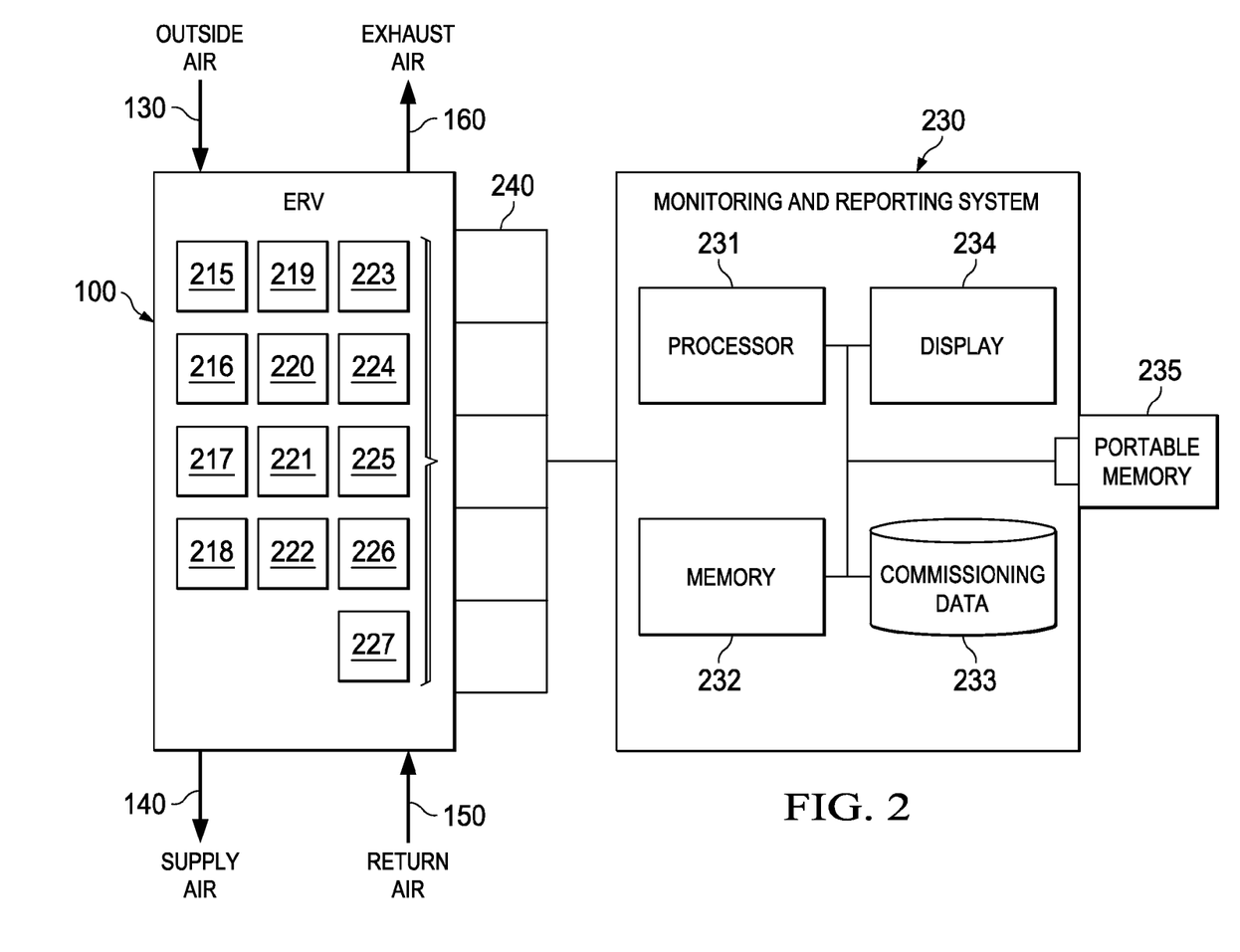
FIG. 2 is a block diagram of one embodiment of a system for monitoring and reporting ERV status.

FIG. 2 is a block diagram showing the ERV 100 together with one embodiment of a system for monitoring and reporting ERV status 230. Those skilled in the pertinent art should understand that alternative embodiments of the monitoring and reporting system 230 operate with ERV embodiments other than the ERV 100.

The ERV 100 has a plurality of sensors 215-227. A pressure sensor 215 is configured to measure the difference between the outside air 130 and the supply air 140 proximate the one or more enthalpy wheels (120 of FIG. 1). Temperature sensors 216, 217, 218 are configured respectively to measure the temperature of the outside air 130, the supply air 140 and the return air 150. A pressure sensor 219 is configured to measure the pressure difference between the return air 150 and the exhaust air 160 proximate the one or more enthalpy wheels (120 of FIG. 1). While not present on all embodiments of an ERV, the sensors 215-219 are found on most ERVs.

Various embodiments of the ERV 100 also have various combinations of additional sensors 220-227. A dirty filter sensor 220 is configured to measure the pressure drop across an air filter (not shown) in the ERV 200. An ERV pressure sensor 221 is configured to measure the overall pressure inside the ERV 200. A flow rate sensor 222 is configured to measure the flow rate of the outside air 130 into the ERV 200. A flow rate sensor 223 is configured to measure the flow rate of the exhaust air 160 out of the ERV 200. Enthalpy sensors 224, 225, 226, 227 are configured respectively to measure the temperature and humidity of the outside air 130, the supply air 140, the return air 150 and the exhaust air 160.

The illustrated embodiment of the monitoring and reporting system 230 includes a processor 231 (e.g., a microprocessor or a microcontroller). A memory 232, which may include one or more of random-access memory (RAM), read-only memory (ROM) or programmable ROM (PROM) (e.g., flash memory), is coupled to the processor 231. In some embodiments of the monitoring and reporting system 230, the processor 231 and the memory 232 are colocated on a single integrated circuit (IC) substrate. A data bus 240 couples the plurality of sensors 215-227 of the ERV 200 to the monitoring and reporting system 230. In one embodiment, the monitoring and reporting system 230 is contained in or mounted on the ERV 200, in which case the data bus 240 is likely contained in the ERV 200. In general, the memory is configured to store data gathered from the plurality of sensors 215-227.

A commissioning database 233 is coupled to the processor 231 and the memory 232 and is configured to contain commissioning data that is typically loaded into the monitoring and reporting system 230 at the factory or in the field during installation of the ERV 200 and monitoring and reporting system 230. The commissioning data includes data specific to the model of ERV 200 to which the monitoring and reporting system 230 is coupled. The commissioning data may include, for example, air flow rates accommodated by the ERV 200, pressure drop thresholds for the ERV 200, service and maintenance schedules for the ERV 200 and such other data that may play a role in the provision of information regarding the performance of the ERV 200 that a customer may find helpful.

Tables 1 and 2, below, set forth examples of commissioning data pertaining to two commercially available ERVs.

TABLE 1

First Example ERV Commissioning Data

| SCFM | Effectiveness (%) | | | | ΔP (in. w.c.) |
|------|----------|--------|------------------|------------------|---------------|
|      | Sensible | Latent | Total (Cooling)  | Total (Heating)  |               |
| 600  | 84.5 | 80.8 | 82.6 | 83.1 | 0.46 |
| 700  | 83.4 | 79.5 | 81.4 | 82.0 | 0.53 |
| 800  | 82.3 | 78.1 | 80.1 | 80.8 | 0.60 |
| 900  | 81.2 | 76.7 | 78.9 | 79.6 | 0.67 |
| 1000 | 80.1 | 75.4 | 77.6 | 78.4 | 0.74 |
| 1100 | 79.0 | 74.0 | 76.4 | 77.2 | 0.80 |
| 1200 | 77.9 | 72.6 | 75.1 | 76.0 | 0.87 |
| 1300 | 76.8 | 71.3 | 73.9 | 74.8 | 0.94 |
| 1400 | 75.7 | 69.9 | 72.6 | 73.6 | 1.01 |
| 1500 | 74.6 | 68.5 | 71.3 | 72.4 | 1.08 |
| 1600 | 73.5 | 67.1 | 70.0 | 71.2 | 1.15 |
| 1700 | — | — | — | — | — |
| 1800 | — | — | — | — | — |
| 1900 | — | — | — | — | — |
| 2000 | — | — | — | — | — |

TABLE 2

Second Example ERV Commissioning Data

| SCFM | Effectiveness (%) | | | | ΔP (in. w.c.) |
|------|----------|--------|------------------|------------------|---------------|
|      | Sensible | Latent | Total (Cooling)  | Total (Heating)  |               |
| 600  | — | — | — | — | — |
| 700  | — | — | — | — | — |
| 800  | — | — | — | — | — |
| 900  | 76.7 | 71.7 | 74.1 | 74.9 | 0.47 |
| 1000 | 75.4 | 70.4 | 72.8 | 73.6 | 0.53 |
| 1100 | 74.2 | 69.2 | 71.6 | 72.4 | 0.60 |
| 1200 | 72.9 | 67.9 | 70.3 | 71.1 | 0.66 |
| 1300 | 71.6 | 66.6 | 69.1 | 69.8 | 0.72 |
| 1400 | 70.4 | 65.4 | 67.8 | 68.5 | 0.79 |
| 1500 | 69.1 | 64.1 | 66.5 | 67.3 | 0.85 |
| 1600 | 67.8 | 62.8 | 65.3 | 66.0 | 0.91 |
| 1700 | 66.6 | 61.6 | 64.0 | 64.7 | 0.98 |
| 1800 | 65.3 | 60.3 | 62.7 | 63.4 | 1.04 |
| 1900 | 64.0 | 59.0 | 61.5 | 62.1 | 1.10 |
| 2000 | 62.7 | 57.7 | 60.2 | 60.9 | 1.17 |

Figure 3:
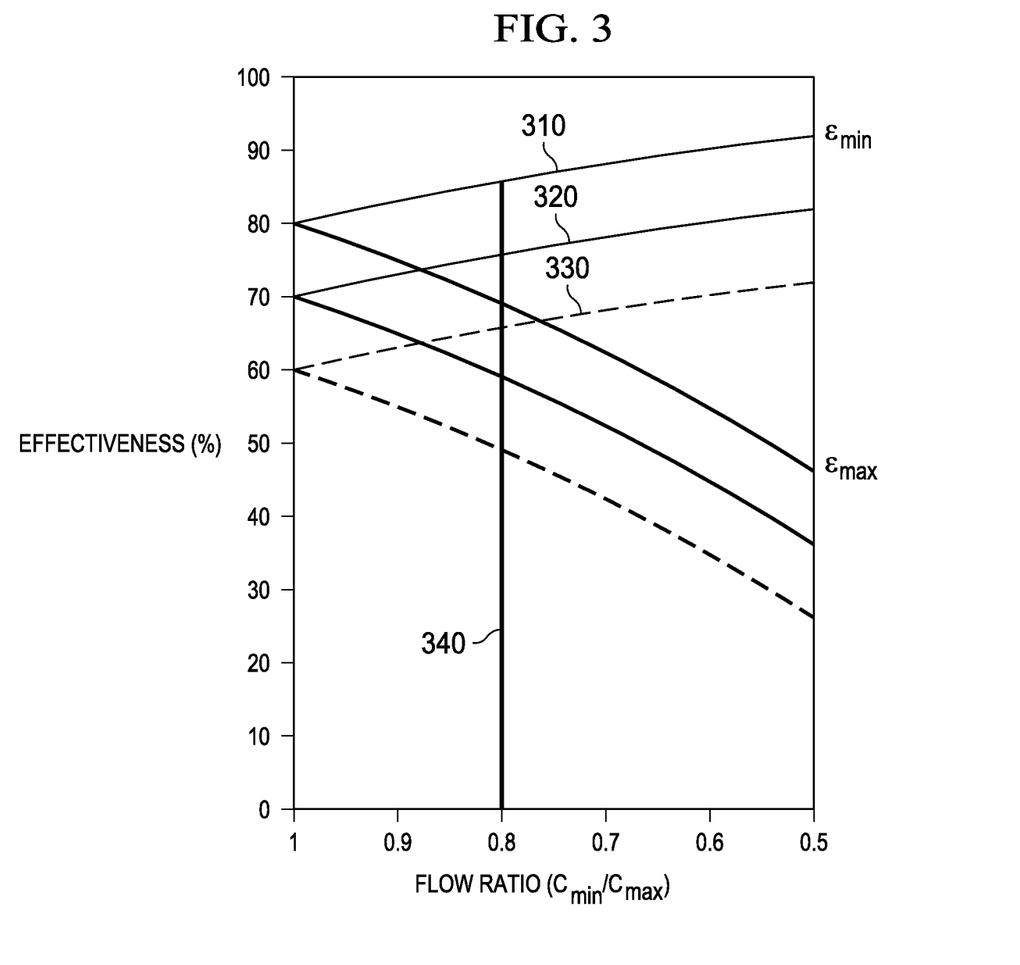
FIG. 3 is a graph relating effectiveness as a function of unequal air flows in one embodiment of an ERV.

Tables 1 and 2 represent the performance of example enthalpy enthalpy wheels when the airflow streams are balanced (i.e., the flow ratio=1). FIG. 3 is a graph relating effectiveness as a function of unequal air flows in one embodiment of an ERV. When air flows are unbalanced, data from the graph of FIG. 3 may be employed to compensate the balanced flow data of Tables 1 and 2.

In FIG. 3, a ratio Cmin/Cmax represents airflow inequality; Cmin equals the air stream through an enthalpy exchange zone (intake or exhaust) with the lowest airflow rate and Cmax equals the air stream through the enthalpy exchange zone with the highest airflow rate. The lines 310, 320, 330 respectively represent ERVs having a base effectiveness of 80, 70 and 60%. A line 340 is an example calculation representing the product of an air imbalance equation assuming a 4000 CFM exhaust airflow rate and a 5000 CFM intake airflow rate.

εmax is the factor (in terms of percentage) by which the effectiveness ratio should be decreased for the flow-stream with the highest air flow (Cmax). The value given by the graph of FIG. 3 is an example reduction to be used calculating the total effectiveness of the flow-path Cmax. εmin is the factor (also in terms of percentage) by which the effectiveness ratio should be increased for the flow-stream with the lowest air flow (Cmin). Again, the value given by the graph of FIG. 3 is an example increase to be used in the total effectiveness of that flow-path Cmin.

Tables 1 and 2, and data derived from the graph of FIG. 3 can be employed to generate commissioning data.

The illustrated embodiment of the monitoring and reporting system 230 includes a display 234 coupled to the processor 231 and memory 232. The display 234 is configured to provide information to a customer or a repairman in visual form. In some embodiments, the display 234 includes one or more indicator lamps or light-emitting diodes (LEDs). In other embodiments, the display 234 includes a liquid crystal display (LCD) for displaying graphical or textual information.

The illustrated embodiment of the monitoring and reporting system 230 includes a data port (not shown) configured to receive a portable memory device 235. The data port may be, for example, a Universal Serial Bus (USB). The portable memory device 235 may be, for example a USB flash drive (UFD). In the illustrated embodiment, the portable memory device 235 is configured to allow data, perhaps a log of historical ERV operational data, to be loaded and carried away for remote analysis, for example on a customer's or repairman's computer.

The illustrated embodiment of the monitoring and reporting system 200 is configured to adapt its operation to a variety of different models of ERVs having different sensor types and locations. In general, the processor 231 is configured to adapt the set of monitoring and reporting functions it performs such that it is appropriate to the model, and the types and locations of the sensors, of the particular ERV 200 to which the monitoring and reporting system 230 is coupled. For example, the processor 231 is configured to carry out monitoring and reporting functions that depend upon humidity measurements only when the monitoring and reporting system 230 is coupled to an ERV 200 having humidity sensors. Otherwise, the processor 231 does not carry out those functions. Some monitoring and reporting functions can be performed using commissioning or other predetermined data in lieu of real time sensor data. The processor 231 continues to perform those functions. However, the processor 231 does not try to carry out a particular monitoring and reporting function unless it has the data required to carry it out. Some examples of monitoring and reporting functions that the processor 231 is configured to carry out will now be described.

The illustrated embodiment of the processor 231 is configured to calculate intake air flow rate (typically measured in cubic feet per minute, or CFM). In one embodiment, the processor 231 calculates intake air flow rate based on data received from a blower of an HVAC system with which the ERV 200 is associated. In another embodiment, the processor 231 calculates intake air flow rate based on input from the flow rate sensor 222 (configured to measure the flow rate of the outside air 130 into the ERV 200). In yet another embodiment, the processor 231 calculates intake air flow rate based on commissioning data loaded into the commissioning database 233. In still another embodiment, the processor 231 calculates intake air flow rate based on input from the pressure sensor 215 (configured to measure the difference between the outside air 130 and the supply air 140 proximate the one or more enthalpy wheels).

The illustrated embodiment of the processor 231 is also configured to calculate exhaust air flow rate. In one embodiment, the processor 231 calculates exhaust air flow rate based on data received from a blower of an HVAC system with which the ERV 200 is associated. In another embodiment, the processor 231 calculates exhaust air flow rate based on input from the flow rate sensor 223 (configured to measure the flow rate of the exhaust air 160 out of the ERV 200). In yet another embodiment, the processor 231 calculates exhaust air flow rate based on commissioning data loaded into the commissioning database 233. In still another embodiment, the processor 231 calculates exhaust air flow rate based on input from the pressure sensor 219 (configured to measure the pressure difference between the return air 150 and the exhaust air 160 proximate the one or more enthalpy wheels (120 of FIG. 1)).

The illustrated embodiment of the processor 231 is further configured to calculate sensible, latent and total ERV effectiveness. As those skilled in the art understand, sensible effectiveness is based on temperature, and latent effectiveness is based on humidity. Total effectiveness is therefore based on both temperature and humidity.

The illustrated embodiment of the processor 231 is further configured to gather data when the one or more wheels is started thereby to obtain baseline performance data for degradation modeling. The illustrated embodiment of the processor 231 is yet further configured to calculate one or more adjustable thresholds of performance degradation over time. In one embodiment, using differing thresholds over time tends to reduce the number of nuisance alarms a customer receives.

The illustrated embodiment of the processor 231 is also configured to calculate target values for one or more of the dry bulb temperature, the humidity ratio and the enthalpy of air downstream (either or both of the supply or the exhaust side) of the one or more enthalpy wheels (120 of FIG. 1). The following balanced flow equations may be used:

Dry-Bulb Temperature:

$$Tsa=Toa-\epsilon s \times (Toa-Tra) \quad \text{cooling:}$$

$$Tsa=Toa-\epsilon s \times (Tra-Tra) \quad \text{heating:}$$

Humidity Ratio:

$$Wsa=Woa \times \epsilon l \times (Woa-Wra) \quad \text{cooling:}$$

$$Wsa=Woa+\epsilon l \times (Wra-Woa) \quad \text{heating:}$$

Enthalpy:

$$Hsa=Hoj-\epsilon t \times (Hoa-Hra) \quad \text{cooling:}$$

$$Hsa=Hoa+\epsilon t \times (Hra-Hoa) \quad \text{heating:}$$

where T is the dry bulb temperature, W is the humidity ratio, H is the enthalpy, oa signifies outdoor air, ra signifies return air, sa signifies supply air, $\epsilon s$ is the sensible effectiveness, $\epsilon l$ is the latent effectiveness and $\epsilon t$ is the total effectiveness.

Note that the above equations do not include the relative mass flow rate of the different air streams which is typically regarded as important which using heat exchanger effectiveness. However, the equations reflect a definition of effectiveness that does not take into account the relative mass flow rate. Since air is the active medium on both sides of the equations, changes due to mass flow variations are minimal and tend to make the equations more complicated.

In the illustrated embodiment, the processor 231 is configured to employ the following procedure to develop ERV enthalpy wheel baseline performance data for degradation modeling:

The processor 231 is also configured to establish the average airflow through the one or more enthalpy wheels (120 of FIG. 1). The processor 231 may use the pressure drop across the one or more enthalpy wheels (120 of FIG. 1), flow rate sensors, commissioning data or data received from a blower of an HVAC system with which the ERV 200 is associated, depending upon the type of sensors installed in the ERV 200.

The processor 231 is further configured to determine if the ERV 200 is in a heating mode or a cooling mode. The processor 231 is still further configured to determine if airflow through the enthalpy wheel are unbalanced (i.e., the flow rates differ for the first and second paths through the ERV 200) and what correction factor, if any, should be applied to compensate for the imbalance.

The processor 231 is yet further configured to identify the ERV 200 that it is monitoring, perhaps by looking up its model number in a table. Having identified the ERV 200, the processor 231 is configured to establish the air flow capacity, the number and size of enthalpy wheels and other characteristics of the ERV 200. In the illustrated embodiment, the processor 231 is configured to match the model number with formulas for the following six performance parameters: sensible cooling effectiveness, latent cooling effectiveness, total cooling effectiveness, sensible heating effectiveness, latent heating effectiveness and total heating effectiveness.

The formulas then establish target dry bulb and wet bulb temperatures for the supply air 140 and exhaust air 160. The processor 231 is configured then to compare these target temperatures with actual measured temperatures to gauge the performance of the ERV 200.

The monitoring and reporting system 230 is configured to generate a log of this information and any alarms should the actual performance fall below an appropriate threshold. The monitoring and reporting system 230 is configured then to display specific service or maintenance information, depending on the type of performance degradation exhibited by the ERV 200. For example, in the illustrated embodiment, a reduction in latent performance indicates a need to clean the one or more enthalpy wheels (120 of FIG. 1) with detergent. Likewise, a pressure difference across the one or more enthalpy wheels higher than expected and a concomitant decrease in sensible performance indicates a need to clean the one or more enthalpy wheels with detergent. A pressure difference across the one or more enthalpy wheels higher than expected, but sensible performance is nominal indicates a need to clean the enthalpy wheel with a brush.

In one embodiment, the processor 231 is configured to employ lookup tables that are part of the commissioning data contained in the commissioning database 233. The illustrated embodiment of the processor 231 is also configured to compare ideal or target performance and actual performance and generate data indicating any differences. Such performance differences may indicate a substandard ERV installation, unusual operating conditions or a need to service or maintain the ERV.

The illustrated embodiment of the monitoring and reporting system 230 is also configured to create one or more logs of sensible, latent or total ERV effectiveness information over time. The log or logs may be displayed on the display 234 or copied or moved to the portable memory device 235 for subsequent display or analysis, for example on a customer's or repairman's computer.

The illustrated embodiment of the monitoring and reporting system 230 is also configured to generate alarms of various types, e.g., using the display 234 as a way to convey the alarm. An alternative embodiment of the monitoring and reporting system 230 employs a speaker or buzzer as an alternative or additional way to convey the alarm. Another alternative embodiment of the monitoring and reporting system 230 employs a wireless or wireline computer network connection as an alternative or additional way to convey the alarm. In the illustrated embodiment, the monitoring and reporting system 230 generates a service alarm when performance drops below a given threshold. As stated above, the monitoring and reporting system 230 may employ differing thresholds to reduce the number of nuisance alarms a customer receives.

The illustrated embodiment of the monitoring and reporting system 230 is also configured to generate one or more alarms to prompt a customer or a repairman to: change the filter, clean one or more enthalpy wheels with a brush, clean one or more enthalpy wheels with detergent, adjust the exhaust air percentage, adjust the intake air on the RTU and defrost the wheel or install an automatic defroster.

Figure 4:
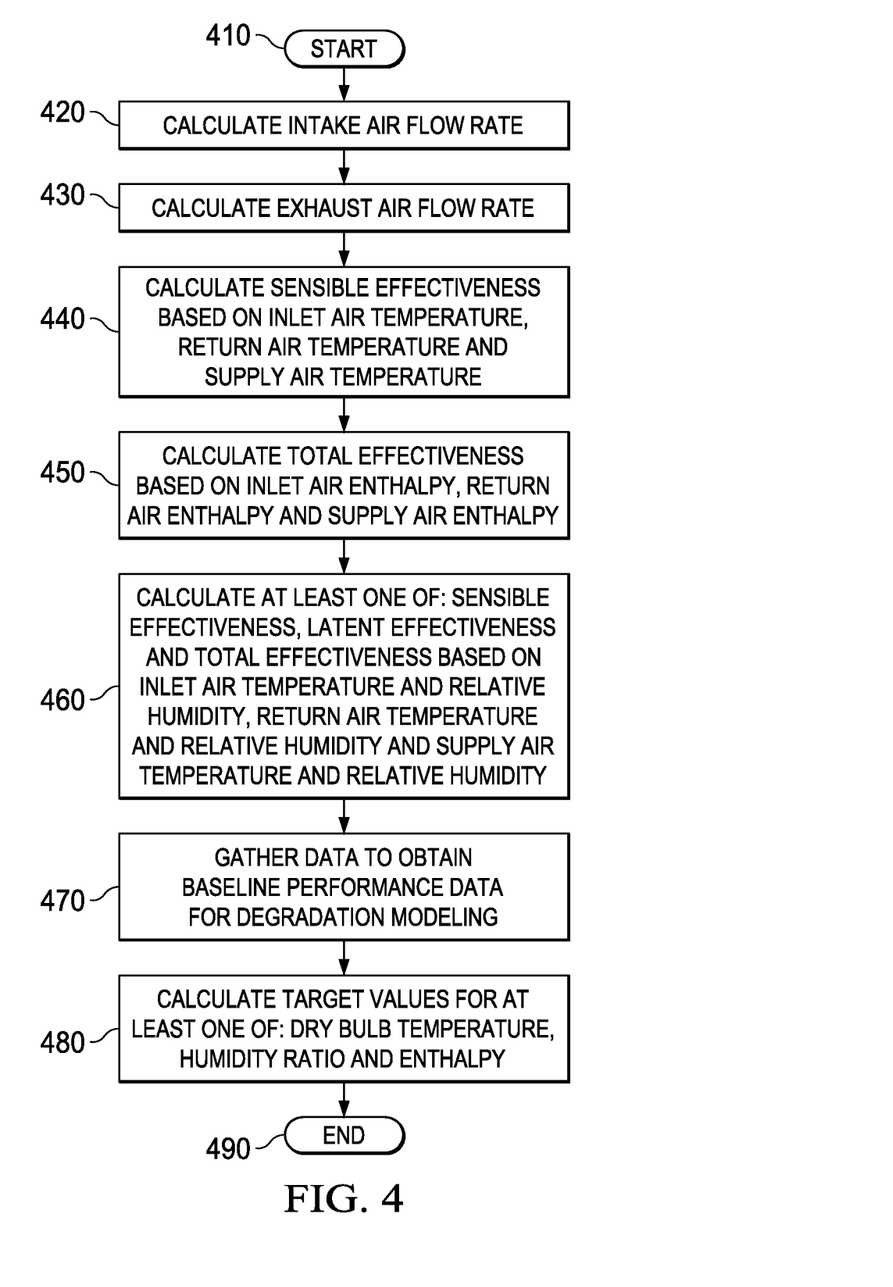
FIG. 4 is a flow diagram of one embodiment of a method of monitoring and reporting ERV status.

FIG. 4 is a flow diagram of one embodiment of a method of monitoring and reporting ERV status, namely one involving the carrying out of various monitoring and reporting functions on the ERV based on a model, and types and locations of sensors, of the ERV. The method begins in a start step 410. In a step 420, intake air flow rate is calculated. In a step 430, exhaust air flow rate is calculated. In a step 440, sensible effectiveness is calculated based on inlet air temperature, return air temperature and supply air temperature. In a step 450, total effectiveness is calculated based on inlet air enthalpy, return air enthalpy and supply air enthalpy. In a step 460, at least one of: sensible effectiveness, latent effectiveness and total effectiveness is calculated based on inlet air temperature and relative humidity, return air temperature and relative humidity and supply air temperature and relative humidity. In a step 470, data is gathered to obtain baseline performance data for degradation modeling. In a step 480, target values for at least one of: dry bulb temperature, humidity ratio and enthalpy are calculated. At least some of the data gathered from the sensors may then be stored. The method ends in an end step 490.

Figure 5:
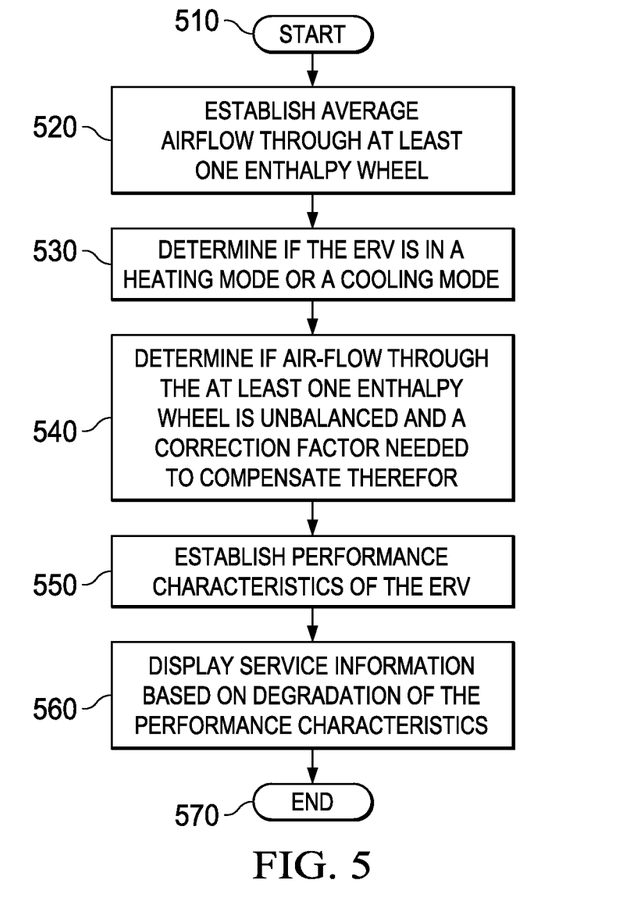
FIG. 5 is a flow diagram of one embodiment of a method of developing ERV enthalpy wheel baseline performance data for degradation modeling.

FIG. 5 is a flow diagram of one embodiment of a method of developing ERV enthalpy wheel baseline performance data for degradation modeling. The method begins in a start step 510. In a step 520, average airflow through at least one enthalpy wheel in the ERV is established. In a step 530, it is determined whether the ERV is in a heating mode or a cooling mode. In a step 540, it is determined if airflow through the at least one enthalpy wheel is unbalanced. If so, it is determined whether a correction factor is needed to compensate for the imbalance. In a step 550, performance characteristics of the ERV are established. In a step 560, service information is displayed based on degradation of the performance characteristics. The method ends in an end step 560.

Those skilled in the art to which this application relates will appreciate that other and further additions, deletions, substitutions and modifications may be made to the described embodiments.

What is claimed is:

1. An energy recovery ventilator (ERV) system, comprising:
   a processor configured to:
      receive sensor measurements from one or more sensors coupled to an ERV;
      determine, using the sensor measurements, total effectiveness based on inlet air enthalpy, return air enthalpy and supply air enthalpy;
      determine whether airflow through at least one enthalpy wheel of said ERV is unbalanced;
      determine, in response to the airflow through said at least one enthalpy wheel being unbalanced, a correction factor to compensate therefor; and
      balance airflow through said at least one enthalpy wheel by applying the correction factor to the determined total effectiveness; and
   a memory coupled to said processor and configured to store data gathered from said one or more sensors coupled to the ERV.

2. The system as recited in claim 1 wherein said memory comprises commissioning data for controlling said at least one enthalpy wheel, and said processor is further configured to store the determined total effectiveness in the commissioning data.

3. The system as recited in claim 1 wherein said processor is further configured to:
   determine, using the sensor measurements, an intake flow rate and an exhaust flow rate; and
   compare the intake flow rate and the exhaust flow rate to determine whether airflow through the at least one enthalpy wheel is unbalanced.

4. The system as recited in claim 3 wherein said processor is configured to determine the intake air flow rate based on at least one of:
   data received from a blower,
   input from a flow rate sensor,
   commissioning data stored in the memory, and
   input from a pressure sensor.

5. The system as recited in claim 3 wherein said processor is configured to determine the exhaust air flow rate based on at least one of:
   data received from a blower,
   input from a flow rate sensor,
   commissioning data stored in the memory, and
   input from a pressure sensor.

6. The system as recited in claim 1 wherein said processor is further configured to determine at least one of:
   sensible effectiveness,
   latent effectiveness, and
   total effectiveness
   based on inlet air temperature and relative humidity, return air temperature and relative humidity, and supply air temperature and relative humidity.

7. The system as recited in claim 1 wherein said processor is further configured to gather data to obtain baseline performance data for degradation modeling.

8. The system as recited in claim 1 wherein said processor is further configured to determine target values for at least one of:
   dry bulb temperature,
   humidity ratio, and
   enthalpy.

9. The system as recited in claim 1 wherein said processor is further configured to:
   establish average airflow through at least one enthalpy wheel in said ERV;
   determine whether said ERV is in a heating mode or a cooling mode;
   establish performance characteristics of said ERV; and
   display service information based on degradation of said performance characteristics.

10. A method, comprising:
    receiving sensor measurements from one or more sensors coupled to an ERV;
    determining, using the sensor measurements, total effectiveness based on inlet air enthalpy, return air enthalpy and supply air enthalpy;
    determining whether airflow through at least one enthalpy wheel of said ERV is unbalanced;
    determining, in response to the airflow through said at least one enthalpy wheel being unbalanced, a correction factor to compensate therefor;
    balancing airflow through said at least one enthalpy wheel by applying the correction factor to the determined total effectiveness; and
    storing data gathered from said one or more sensors coupled to the ERV.

11. The method as recited in claim 10 further comprising storing the determined total effectiveness in commissioning data, the commissioning data for controlling said at least one enthalpy wheel.

12. The method as recited in claim 10 further comprising
    determining, using the sensor measurements, an intake flow rate and an exhaust flow rate; and
    comparing the intake flow rate and the exhaust flow rate to determine whether airflow through the at least one enthalpy wheel is unbalanced.

13. The method as recited in claim 12 further comprising determining the intake air flow rate based on at least one of:
    data received from a blower,
    input from a flow rate sensor,
    commissioning data associated with the ERV and stored in the memory, and
    input from a pressure sensor.

14. The method as recited in claim 12 further comprising determining the exhaust air flow rate based on at least one of:
    data received from a blower,
    input from a flow rate sensor,
    commissioning data associated with the ERV and stored in the memory, and
    input from a pressure sensor.

15. The method as recited in claim 10 further comprising:
    determining at least one of:
    sensible effectiveness,
    latent effectiveness, and
    total effectiveness
    based on inlet air temperature and relative humidity, return air temperature and relative humidity, and supply air temperature and relative humidity.

16. The method as recited in claim 10 further comprising gathering data to obtain baseline performance data for degradation modeling.

17. The method as recited in claim 10 further comprising determining target values for at least one of:
    dry bulb temperature,
    humidity ratio, and
    enthalpy.

18. The method as recited in claim 10 further comprising:
    establishing average airflow through at least one enthalpy wheel in said ERV;
    determining if whether said ERV is in a heating mode or a cooling mode;
    establishing performance characteristics of said ERV; and
    displaying service information based on degradation of said performance characteristics.

* * * * *